United States Patent

[11] 3,564,190

| [72] | Inventors | Sergo Gevorkovich Kandajan;<br>Konstantin Agasievich Mndzhojan; Eduard Petrosovich Gevorkjan, Erevan; Anatoly Izrailevich Aronov; Arkady Timofeevich Kravets; Alexandr Shmilovich Opolinsky; Petr Evmenovich Korochkin, Moscow, U.S.S.R. |
|------|-----------|---|
| [21] | Appl. No. | 311,383 |
| [22] | Filed | Sept. 25, 1963 |
| [45] | Patented | Feb. 16, 1971 |
| [73] | Assignee | Experimentalny Nauchno - Issledovatelsky Institute Metallorenzhushichikh Stankov Moscow, U.S.S.R. |

[54] METHOD OF MACHINING COMPLICATED SURFACES
10 Claims, 16 Drawing Figs.

[52] U.S. Cl. .................................................. 219/69;
51/60; 90/24; 204/143
[51] Int. Cl. ...................................................... B23p 1/04,
B23p 1/08, B23p 1/12
[50] Field of Search........................................... 219/50,
69; 51/58, 59, 60, 59 (SS); 219/69 (M) & (V); 204/143; 72/406; 90/24; 51/59 (SS); 83/321; 219/68—70; 204/143 (ECM)

[56] References Cited
UNITED STATES PATENTS

| 2,385,198 | 9/1945 | Engle ............................ | 219/69(M)UX |
| 2,580,716 | 1/1952 | Balamuth ...................... | 51/59(SS) |
| 2,746,917 | 5/1956 | Comstock ..................... | 219/69(M)UX |
| 2,960,314 | 11/1960 | Bodine ......................... | 51/59(SS)X |
| 3,433,919 | 3/1969 | Braudeau et al. ............. | 219/69(V) |
| 2,654,256 | 10/1953 | McKechnie ................... | 219/69 |
| 2,766,364 | 10/1956 | Higgins et al. ................ | 219/69 |

OTHER REFERENCES
" New Method Machines" A. S. Cohan - 3 pp. (Reprint from " Journal of Metals" Vol. No. 3 March 1951, pp. 216—217) copy in Cl. 51–59 S.S.

*Primary Examiner*—R. F. Staubly
*Attorneys*—Holman & Stern and 1

ABSTRACT: The formation of a complex surface on a workpiece in which a workpiece and a tool having a contour providing an operative cutting surface substantially complementary to the desired surface to be formed are supported in overlapping relationship and the tool and workpiece are subjected to a relative translational forming movement along a closed trajectory line in a plane perpendicular to the direction of feeding movement so that any point on the operative cutting surface of the tool follows an identical trajectory to progressively engage points on the operative movement along a closed trajectory line in a plane perpendicular to the direction of feeding movement so that any point on the operative cutting surface of the tool follows an identical trajectory to progressively engage points on the operative surface of the tool with the workpiece. The relative forming movement is continued until the workpiece is formed to provide the desired complex surface. An electrolyte can be introduced between the tool and workpiece and an electric current supplied to the tool and workpiece for providing a combined electromechanical forming operation as well as supplying an abrasive suspension between the tool and workpiece.

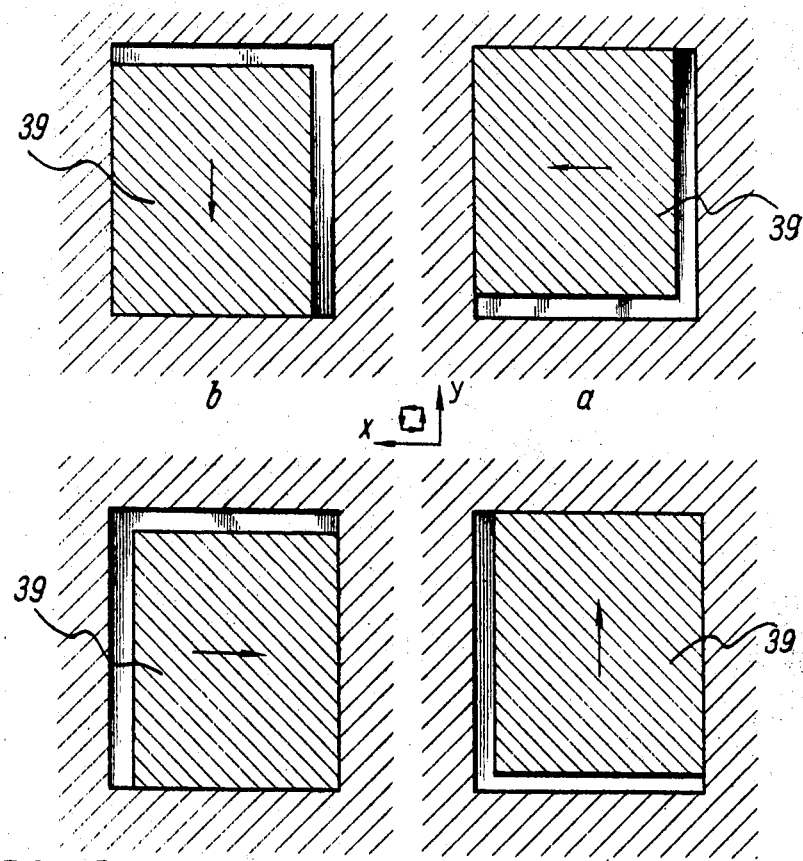
FIG. 6
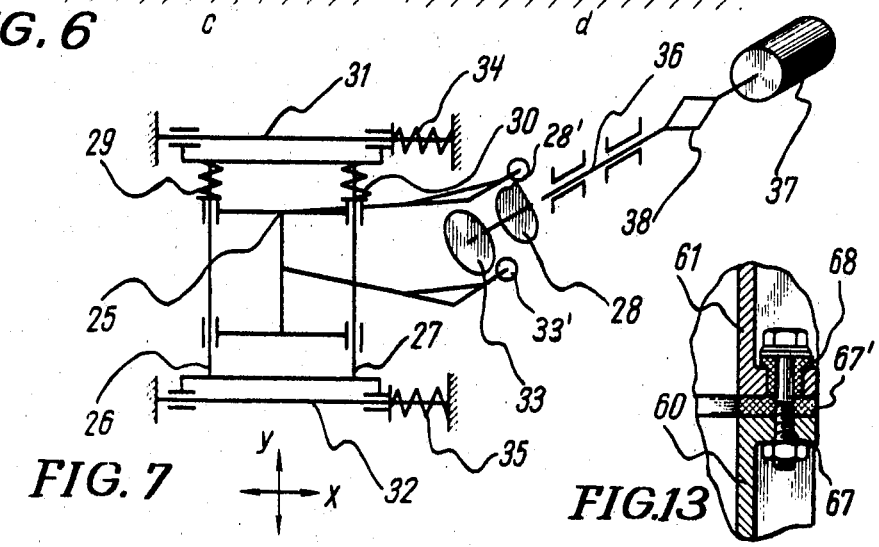
FIG. 7
FIG. 13

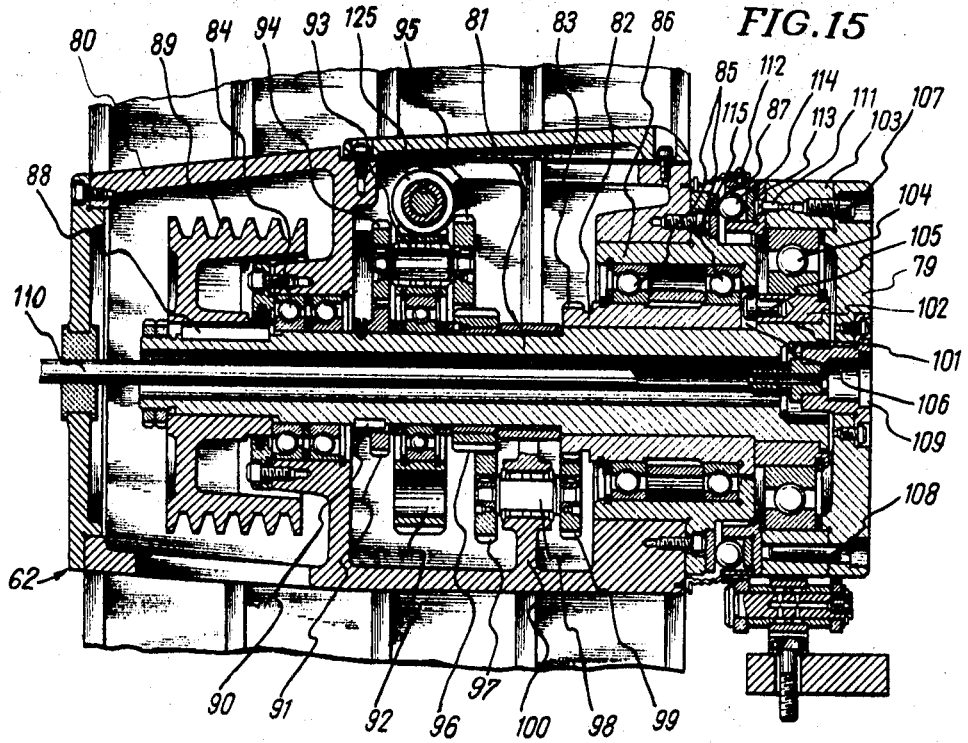

METHOD OF MACHINING COMPLICATED SURFACES

The present invention relates to methods of forming complicated surfaces by a tool the contour of whose working face approximately coincides with the required contour of the workpiece surface, and the tool and the workpiece are actuated to perform feeding and shaping motions.

Another object contemplated in the present application is the provision of a tool and a machine for carrying out the method.

Until lately complicated surfaces of workpieces such as dies, press molds, etc. have been formed by shaving with cutters having a point contact with the work, and by form cutters having a linear contact, or manually by a turner, or by filling the material into a mold (for instance casting or pressing), or by plunging the tool into the workpiece in an electric erosion or ultrasonic process.

The forming of complicated contours in milling machines by the above methods, or manually, is laborious, efficient only to a limited extent, and requires a highly skilled worker.

The forming of complicated contours by casting, stamping or pressing is also disadvantageous in that these methods do not permit, in the course of the process controlling of the dimensions of the contour faces, which may be distorted, for instance, by thermal shrinkage of the work during casting or die stamping.

The principal object of the present invention is to provide a highly efficient method of forming complicated contours by copying the entire working face of the tool on the workpiece, the contour of the tool face approximately coinciding with the required contour of the workpiece.

In connection with the above-mentioned object, for forming complicated contours according to the method mentioned earlier, the tool and the workpiece to be formed are actuated to perform relative curvilinear oscillating, and preferably progressive movements along trajectories, the dimensions and contour of whose enveloping surface coincide with the required contours of the workpiece, whereas the contour and dimensions of the tool are chosen in accordance with the contemplated oscillating motions.

The oscillating movements may be performed along closed trajectories coinciding with the required profiles of the surface of the workpiece, if these profiles are viewed as the workpiece is intersected by surfaces coinciding with said trajectories, and particularly, along circumferential trajectories, including a rectangular perimeter, and other broken or curved lines.

Another object of the invention is to provide a method of forming complicated contours by a tool, the shape of whose working face approximately coincides with the required contour of the surface of the work, and permitting, in the course of operation, a variation in the dimensions, the taper and the angles of inclination of the formed surfaces for achieving accurate results.

For achieving this objective in the process of forming various contours according to the above-mentioned method, the tool and the workpiece, in accordance with their configuration, are moved progressively with respect to each other or perform progressive oscillating curvilinear motions combined with angular oscillations, whose amplitudes are altered by a required value, identical or different, in opposite directions.

It is still another object of the invention to accelerate the process of forming complicated contours according to the above-mentioned method.

This objective is achieved by supplying electrolyte and electric current to the gap between the tool and the formed surface, thus combining electric and mechanical processes. The same objective may be achieved by supplying a current conductive abrasive suspension in the gap between the tool and the formed surface.

Throughout the formation of surfaces, involving a shaving operation, it is advisable to pump air out of the working area to remove shavings.

For more efficient removal of shavings in the course of the process, the workpiece may be occasionally retracted from the tool.

It is among other objects of the invention to provide a tool and machine to carry out the method described above.

As has been mentioned, the tool for carrying out the method should have a working face of a shape approximately coinciding with the required shape of the workpiece surface.

The working face of the tool may be formed, by cutting elements, for instance, with notched edges but it has been found that this face may advantageously be formed by an electric erosion process. After the electric erosion process the face of the tool is rough or alveolar, thus providing a machining surface on the tool.

The machine for carrying out the method, like the known types of milling machines, is provided with holders for the tool and the workpiece and with mechanisms to move said holders relative to each other in order to achieve feeding, shaping and coordinating motions. But unlike milling machines, the mechanism which initiates shaping motions in the claimed machine of this invention is provided with a means to impart curvilinear oscillating motions to one of the holders, and with a means for limiting the rotation of the holder.

The device to impart curvilinear oscillating motions to the holder can be provided, for instance, in the form of two cam mechanisms, which actuate the holder to move at the same time in rectilinear reciprocal motions in two perpendicular directions along respective guides, wherein the holder must be under the effect of a spring when moving in these directions.

The device to impart curvilinear oscillating motions to the holder is preferably in the form of a controlled eccentric couple with a bearing supporting the holder.

For controlling the eccentric couple in changing the amplitude of holder oscillations in operation, a planet mechanism may be used in which two members with a 1:1 transmission ratio are connected to the eccentric couple, while a third member serves to turn the first two members relative to each other. With a view to increasing the rigidity of the flexible coupling between the holder and the frame of the mechanism which ensures shaping motions, the holder and the frame are provided with parallel surfaces with a plurality of balls under compression disposed between and rolling on such surfaces.

The above-mentioned arrangement for limiting holder rotation may be in the form of cross shaped guides, fixed to the machine frame, or a rod system, also fixed to the machine frame.

Further objects and advantages of the invention will be apparent from the following description taken in conjunction with the accompanying drawings wherein:

FIG. 1 is a kinematic diagram of the arrangement for forming complicated contours in accordance with the proposed method.

FIGS. 2, 3, and 4a show alternative embodiments of the arrangement for limiting holder rotation.

FIG. 5 shows a sectional view of the workpiece and the tool on a plane coinciding with the trajectory of the circular motions of the tool relative to the workpiece.

FIGS. 6a, b, c and d show the tool in section in various positions with respect to the workpiece when the tool moves along a rectangular perimeter.

FIG. 7 is a kinematic diagram of the arrangement providing for curvilinear tool motion or workpiece motions by means of cam mechanisms.

FIG. 13 is a section along 13–13 in FIG. 12.

FIG. 15 is a section along line 15-15 in FIG. 14.

Figure 1:
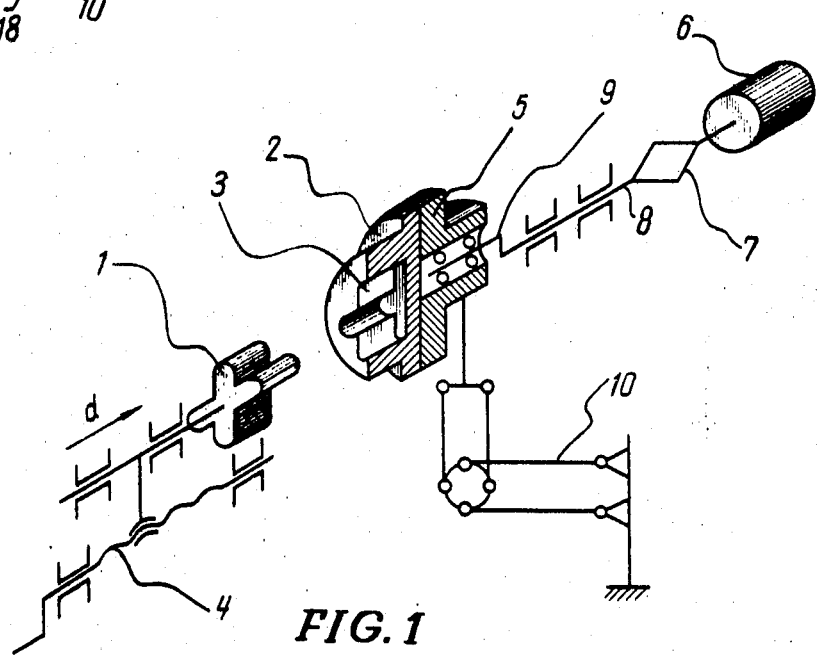

A diagrammatic illustration of the invention is shown in FIG. 1, wherein 1 indicates a workpiece with complicated contours to be obtained by the process according to the proposed method.

For achieving this objective it is advisable to use a tool 2, whose working face 3 approximately coincides with the required contour of the workpiece 1.

In operation, the workpiece 1 is fed by a screw device 4 in the direction shown by the arrow $d$, while the tool 2 mounted on a holder 5 is at the same time actuated to perform circular progressive motions by a mechanism comprising a motor 6, a gear box 7, a shaft 8 and an eccentric 9, which supports the holder 5, and by a device 10, which limits the rotation of the holder 5 and cooperates with the above mechanism.

Due to the combined motion of the tool and the workpiece, the latter sinks into the hollow of the tool 2 as the result of a shaving action or as the result of plastic deformations.

Depending on the configuration of the contour to be formed, the device 10 for limiting holder rotation, may be provided in several different forms.

Figures 4, 4A:
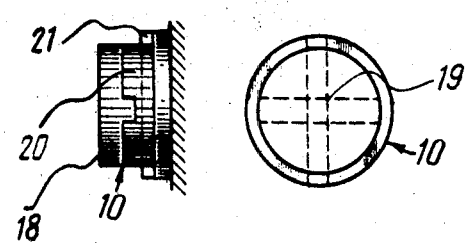
Figure 2:
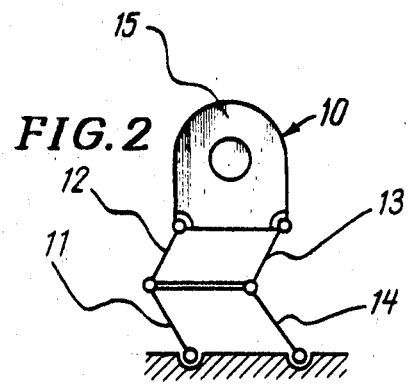
Figure 3:
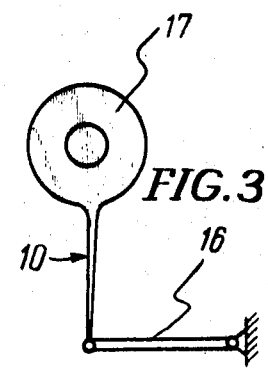

Three of the possible forms of the device 10 are shown in FIGS. 2, 3 and 4.

FIG. 2 shows the device 10 in the form of a link device, whose links 11, 12, 13, and 14 form parallelograms.

The links 11 and 14 are hinged to the machine frame, while the links 12, 13 are hinged to a member 15, coupled to the tool holder 5.

The device described ensures progressive motions of the holder 5 within the limits of movement of the member 15 depending on the length of the links 11, 12, 13 and 14.

FIG. 3 shows a device 10 for limiting rotation of the holder 5 manufactured in the form of two hinge-coupled members 16 and 17, which, in addition to progressive motion of the holder 5 fixed to the member 17, provides for narrow angular oscillations.

FIG. 4 shows a side elevation and FIG. 4a an end elevation device 10 for limiting holder rotation manufactured as a cross bush, whose member 18 coupled to the holder 5 may move along the cross guides 19 of member 20, which in turn may move along guides 21 on the machine frame.

Figure 5:
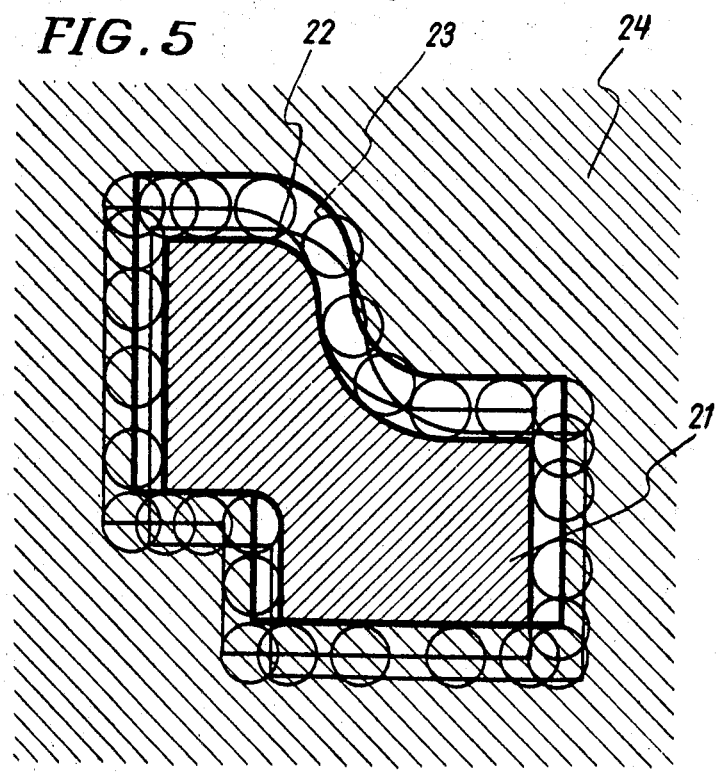

FIG. 5 illustrates the formation of the contour of the workpiece as it is intersected by a plane and also shows the trajectories of points on the tool surface. The profile of the workpiece 21 is formed along an envelope 22 of the circular trajectories 23, traced by points of the working face of a cutter or tool, 24. The size and the radii of the workpiece curved portions, embraced by the tool during the process, and the envelopes are correspondingly less and more in accordance with the radius or amplitude of circular oscillations. The amplitude of the oscillations may be adjusted and varied in the course of operation, and this will be explained below. Contours that do not coincide with the trajectories of the tool holder motions, are cut off intermittently by all the cutting edges of the tool touching said contours. This results in gaps being formed intermittently between the workpiece and the tool, thus facilitating the removal of shavings.

In machining contours, that coincide with the contours of the trajectories of motion, the tool is constantly in contact with the workpiece. In this case the workpiece and the tool are actuated to additionally oscillate in a direction perpendicular to the planes traced by the trajectories of motions, thus facilitating the removal of shavings.

The trajectories of motions, that ensure contour shaping, are made similar to the shape of the required contours of the workpiece to ensure minimum distortion of the resulting workpiece. For instance, in forming the hollows of rectangular profile workpieces it is reasonable to actuate the workpiece or the tool to move along the rectangular perimeter, as shown in FIG. 6. This prevents rounding of corners in the hollow even in cases when the contours are embraced by the tool.

For any required trajectory, the motions of the workpiece and the tool are achieved by cam mechanisms. FIG. 7 shows the kinematic diagram of a mechanism which actuates the holder of the lathe to move the same progressively along variable trajectories, the tool or the workpiece being gripped in the holder.

A holder 25 is actuated to move on the axis $y$ along guides 26 and 27 in an upward direction by cam 28 and follower 28' and in a downward direction by springs 29 and 30.

The guides 26 and 27 together with the holder 25 are actuated to move along the axis $x$ on guides 31 and 32 toward right as viewed in FIG. 7 by the cam 33 and follower 33' and toward the left by springs 34 and 35.

The cams 28 and 33 are fixed on a shaft 36 and are actuated by a motor 37 through a gear box 38. The configuration of the cams defines the pattern of motion of the holder 25 in two intersecting perpendicular directions. The resultant motion may be performed according to any pattern depending on the configuration of the cams 28 and 33. For instance, in a specific case, when the patterns of the holder motion, as caused by the cams 28 and 33, are correspondingly defined by the equations:

$x = r.\sin \omega t$; $y = r.\cos \omega t$, where $\omega$ is the angular velocity of the shaft 8, $t$—is time; the trajectory of the resultant motion is expressed by a circle with the radius $r$.

For obtaining motion trajectories traced along a rectangular perimeter, the cams 28 and 33 must be actuated intermittently through one-forth revolution of the shaft 36. In this case through the first quarter revolution of the shaft 36, the holder 25 and the tool 39 carried thereby are moved only in the direction $x$ by the cam 33 as shown in FIG. 6a. Through the second quarter revolution of the shaft 36 no movement in the direction $x$ results, but the cam 28 moves the holder 25 in the direction $y$ as shown in FIG. 6b. Then follows reverse movement of the holder 25 in the direction $x$ (as shown in FIG. 6c), and lastly movement of the holder 25 in the direction $y$ (as shown in FIG. 6d).

For accelerating the machining of complicated surfaces it is recommended to supply electrolyte and an electric current between the tool and the workpiece. In this case the surface of the machined work is subjected to a combined mechanical and electrochemical action, that is, anode dissolving of the machined workpiece and mechanical removal of films, formed as a result of current flow, from the surface of the workpiece are obtained. When used for electromechanical machining of the contours the tool is manufactured from current conducting materials. The working faces of the tool may be smooth, corrugated or abrasive. An abrasive may also be added to the electrolyte for obtaining an abrasive suspension.

Thanks to the employment of an electric current and an electrolyte the efficiency is 3 to 4 times higher as compared to mere mechanical machining.

Figure 8:
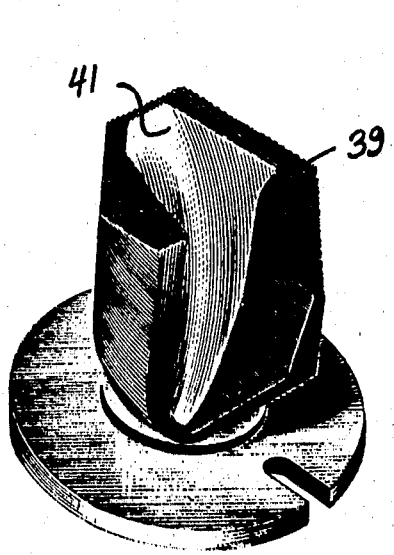
FIG. 8 shows one possible form of the tool for forming complicated contours.
Figure 9:
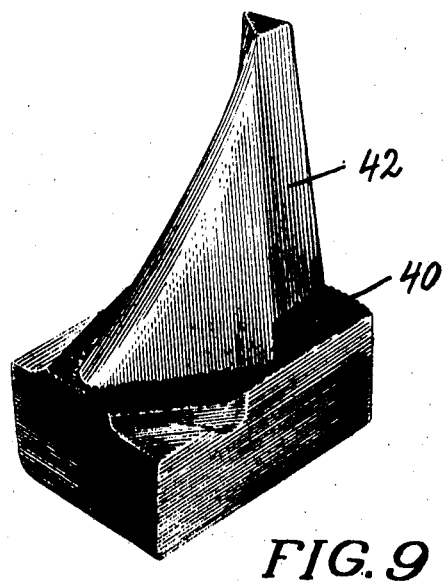
FIG. 9 shows a workpiece formed by the tool shown in FIG. 8.

FIG. 8 shows one of the possible tools, that may be used in forming complicated contours, and more particularly, in manufacturing an electrode as shown in FIG. 9 for use in an electrode erosion process. The working face of the tool is provided with cutting edges. At end portion 39 of the tool these edges are shaped as rough cuts, serving to machine surface 40 (See FIG. 9), whereas shaped inner portion 41 of the tool is provided with alveolar cuts, formed by an electroerosion process, and serves to machine surface 42.

The cutting edges may be achieved in the working faces of the tool by various methods, such as abrasion of the tool, corrugation or cutting, or by supplying an abrasive suspension in the working area between the tool and the workpiece.

Figure 11:
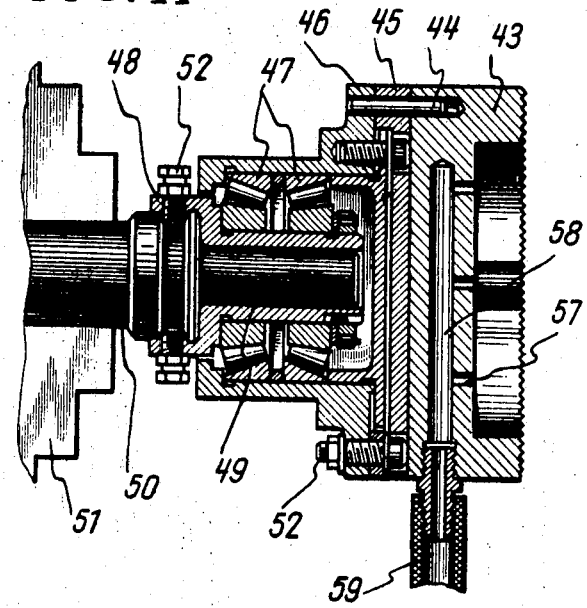
FIG. 11 is a section along line 11–11 in FIG. 10.
Figure 10:
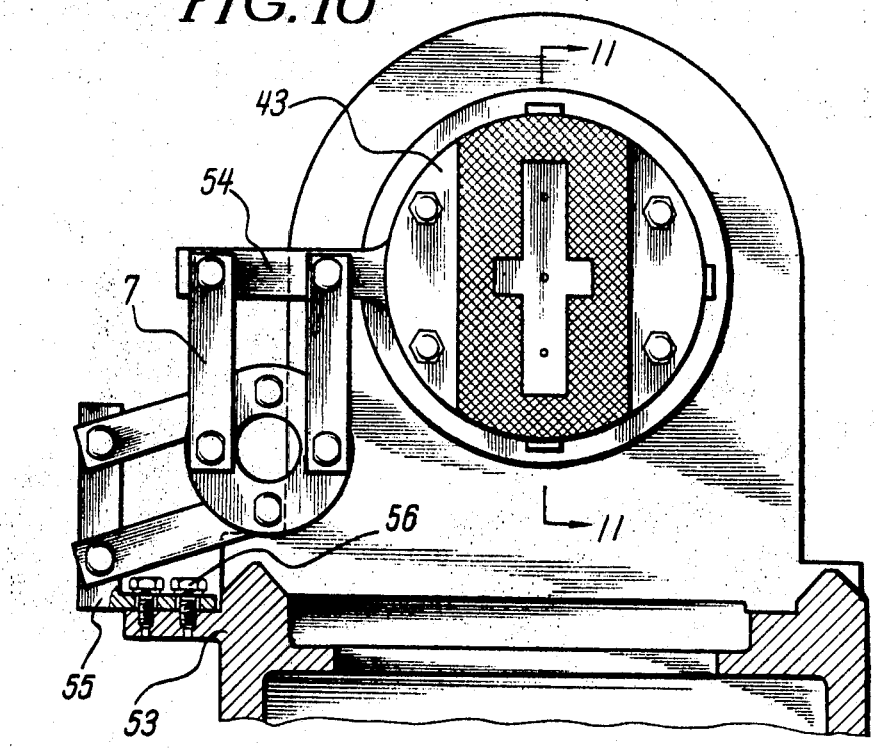
FIG. 10 shows another tool for machining complicated contours and the holder therefor, both being mounted on a suitable machine tool.

The arrangement ensuring circular progressive motions, and the machining of complicated contours in a machine tool, is shown in FIGS. 10 and 11.

As shown in FIG. 11 tool 43 is fixed by screws 44 to a holder 45 and a body 46 of the device, which accommodates the bearings 47, mounted on the eccentric couple, which is a combination of an eccentric bushing 48 and a shank 49 of a shaft 50, secured in a chuck 51 of the machine tool. The shank 49 is eccentric to the shaft 50. The bushing 48 is fixed to the shank 49 by the screws 52. The amount of eccentricity is adjusted by rotating the bushing 48 with respect to the shank 49. The holder 45 is mounted on the body 46 by bolts 52.

The rotation of the holder 45 with the tool 43 and the body 46 relative to a frame 53 of the machine tool is limited by a device comprising hinge coupled members, a terminal member 54 of which is connected to the holder 45, and base 55 being fixed to the frame 53 of the machine tool by the screws 56.

When the base 55 is stationary, the member 54 may move in a plane perpendicular to the axis of shank 49 and is always parallel to the initial position.

As a result of the combined operation of the eccentric device and limitation of holder rotation by the member 54 the tool 43 is actuated to perform circular progressive motions.

The workpiece is mounted on the support on a machine tool (which is not shown in the drawing) and is longitudinally fed into engagement with the tool 43, provided with openings 57, which communicate with a duct 58, connected to a branch pipe 59, which serves to deliver the fluid or to withdraw the shavings.

In the event that machining is performed by plastic deformations leaving no shavings the tool presses the desired from on the workpiece.

The machine tool for machining complicated workpiece contours and individual units of said machine tool are shown in FIGS. 12, 13, 14, 15.

Figure 12:
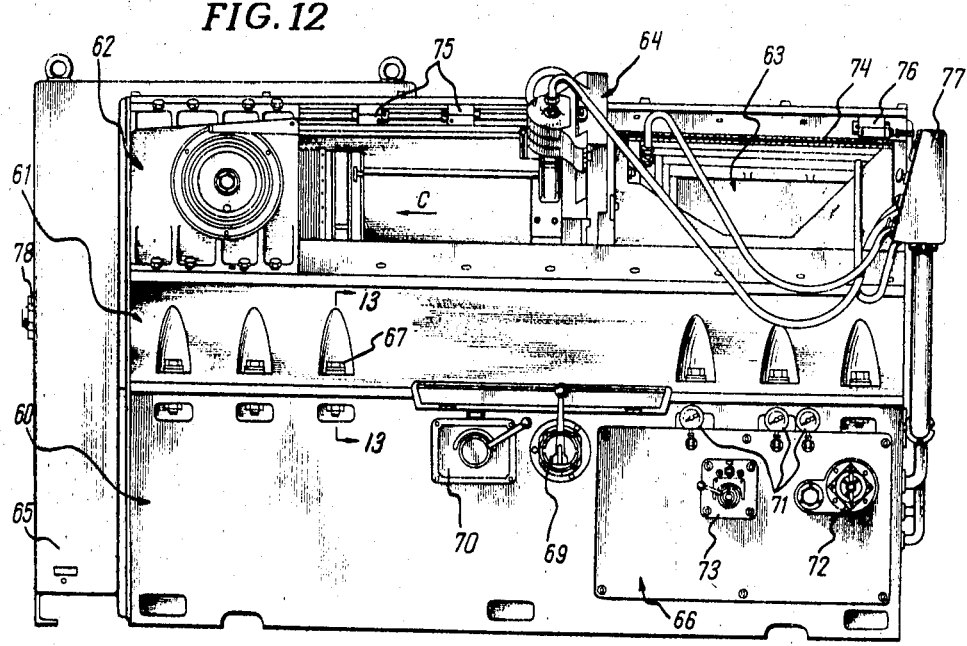
FIG. 12 is a front view of a machine tool for forming complicated contours.

In FIG. 12 the machine tool comprises the following main elements: a frame comprising a bedplate 60 and a table 61, a machining head 62, a feed device 63, a workholder 64, an electric stove 65, hydraulic control panel 66, and a dust arrester (which is not shown).

The machining head 62 is intended to oscillate the tool and is provided with an arrangement permitting adjustment of the amplitude of tool oscillations during the operation of the machine tool.

The vibrations, resulting from operation of the head 62, are transmitted to the table 61, and to prevent the transmission of such vibrations to the surrounding space, the table and the bedplate are connected through rubber washers 67 (FIG. 13) by bolts 67 furnished with rubber bushings 68.

The direction of feeding of the holder 64 carrying the workpiece is controlled by a switch 69, and the rate of curvilinear oscillations of the tool is controlled by a switch 70.

In the machine tool under consideration the feed device 63 is operated hydraulically. The fluid pressure within the system of this device is indicated by gauges 71, and the fluid is purified by a suitable filter 72. The feed pressure of the device 63 is adjusted by a choke control 73.

The movement of holder 64 along guides 74 is reversed by limit switches 75—76.

Number 77 in FIG. 12 indicates the control panel of the machine tool, number 78 indicates the impulse metering relay, which causes retraction of the tool a definite number of times to remove the shavings formed during the process between the face of the tool and the machined surface.

Figure 14:
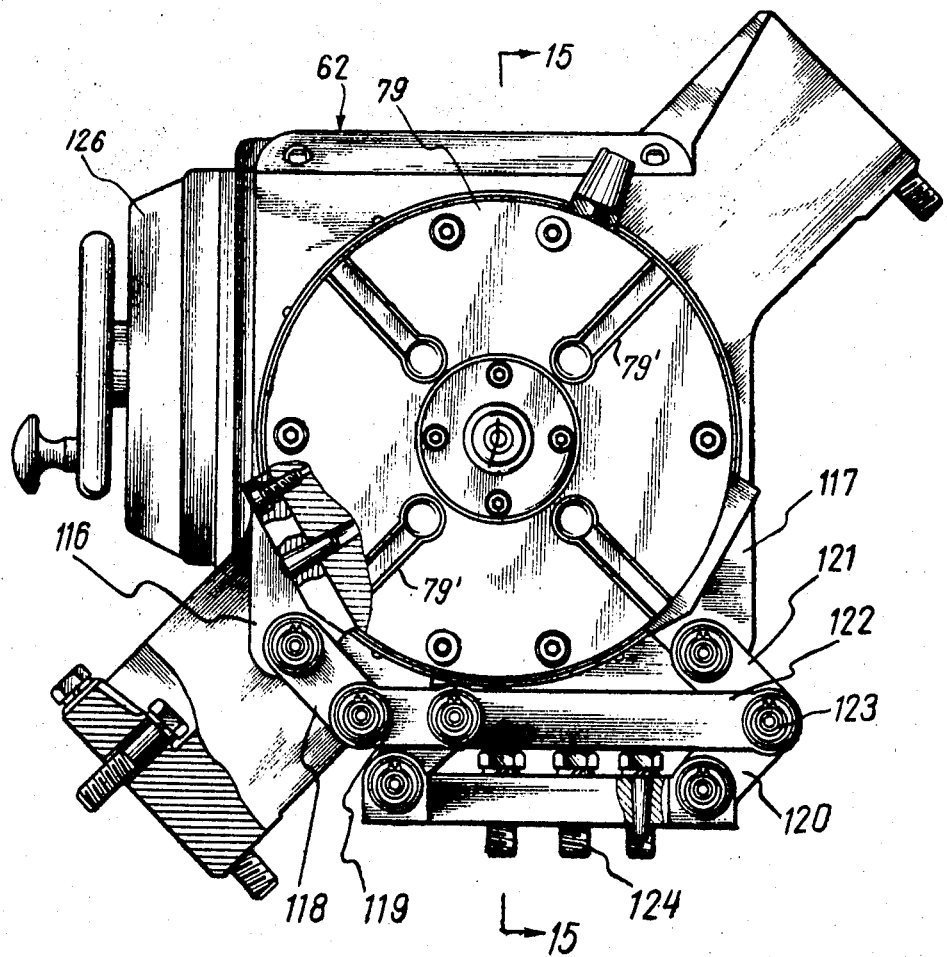
FIG. 14 is a fragmentary elevational view with parts broken away and in section and looking in the direction of the arrow C in FIG. 12.

The machining head 62 carrying the tool holder 79, is composed of the following parts as shown in FIGS. 14 and 15:

A body 80 accommodates a spindle 81 with a bushing 82 independently arranged thereon and provided with a tooth rim 83. The spindle 81 rotates on four bearings: two radial support bearings 84, arranged in the body 80, and two radial bearings 85, mounted in a cup 86, which is secured to the body 80 by screws 87. A key 88 serves to mount a drive pulley 89 on the spindle 81, and a key 90 serves to mount gear 91 on the spindle 81. The spindle 81 also supports a worm wheel 92 for free rotation, and the worm wheel 92 carries a shaft 93, on which are mounted gears 94 and 95, the latter engaging the gear 96, which in turn meshes with gear 97, mounted on shaft 98, on the other end of which is mounted gear 99 which is in engagement with the toothed rim 83 on the bushing 82. The shaft 98 is mounted in roller with bearings on a boss 100 of the body 80.

On the right-hand end of the spindle 81 as shown in FIG. 15 there is provided an eccentric surface 101, which serves to mount an independent bushing 102, on which is mounted ball bearing 104 carrying washer 103.

The eccentric bushing 102 is provided with a pressed in pin 105 which engages the slot 106 in the bushing 82. The holder 79, provided with radial slots 79' for mounting the tool, is fixed to the washer 103 by screws 107 and dowels 108.

A central opening 109 of the holder 79 is connected to a dust arresting device (which is not shown in the drawing) through a flexible hose 110.

Flathead screws 111 serve to fix a grooved washer 112 to the washer 103 on the side opposite the tool holder 79, said washer 112 accommodating a flat washer 113 and balls 114, which are displaceable radially during half the movement of the tool holder 79. The balls 114 are held in the grooved washer 112 by a flat washer 115, fixed to the cup 86.

The balls 114 and the flat washers 113 and 115 serve to support the axial load on the tool holder 79.

The lower part of the tool holder 79 is furnished with two arms 116 and 117 (See FIG. 14) which couple the tool holder 79 to the stationary table of the machine tool by bolts 124, through a hinge parallelogram composed by four members 118, 119, 120, 121, a cross bar 122 and a pin 123.

The worm wheel 92 engages a worm 125 which is connected to a flywheel 126 through a planet reducing gear (not shown in the drawing).

The planet reducing gear is included in this mechanism for synchronizing the rotation of the limb of the flywheel 126, and the eccentric bushing 102.

The operation of the machining head is in the main as follows:

Rotation of the pulley 89 serves to directly drive the spindle 81 and to directly drive the eccentric bushing 102 through the gears 91, 94, 95, 96, 97, 99, the bushing 82 and the pin 105.

The number of gear teeth has been selected to provide a transmission ratio of one to one, and as a result the spindle 81 and the eccentric bushing 102 mounted thereon rotate together at the same angular velocity.

Consequently, by reason of the rotation of the spindle 81 each point on the holder 79, connected to the table of the machine tool through the hinge parallelogram, performs circular motions with a radius equal to the combined eccentricity of the eccentric bushing 102 and the eccentric surface 101 on the spindle 81. The combined eccentricities are altered by revolving the eccentric bushing 102 with respect to the eccentric surface 101 on the spindle 81, by rotating the flywheel 126, connected to the worm 125. Upon rotation of the worm 125 the worm wheel 92 and the shaft 93 mounted thereon with the two revolving gears 94 and 95, are rotated additionally. This supplimentary rotation is added to the main rotation of the gears 94 and 95 and through the gears 96, 97, 99, the toothing 83, the bushing 92, and the pin 105, is transmitted to the eccentric bushing 102, which revolves relative to the eccentric surface 101 on the spindle 81 to change the total eccentricities and, consequently, the radius of the circular motions of the points on the holder 79. It will be appreciated from the above that the total eccentricity can be altered during the operation of the machining head. The revolutions of the spindle 81 are altered by varying the speed of drive motor.

Upon rotation of the spindle 81 the tool holder 79 and the tool fixed thereon, are actuated to oscillate, whereby each point on the holder of the tool moves along a circular trajectory whose radius is a sum of the eccentricities of the eccentric surface 101 on the spindle 81 and the eccentric bushing 102. The workpiece fixed in the holder 64 (See FIG. 12) is fed into engagement with the vibrating tool with a definite force by the hydraulic cylinder (not shown in the drawing) of the feed device 63.

By reason of the oscillating motion of the tool, in engagement with the workpiece the latter is machined into a form resembling the geometric contours of the working face of the tool.

This invention is advantageous in that it provides for accurate machining of the geometric contours as well as the size of workpieces when they are machined in the presence of vibrations and considerable axial forces.

Another advantage of the present invention is that it provides for adjustment of machining dimensions during operation of the machine tool and without changing the dimensions of the tool.

The present invention, used in machining workpieces, such as graphite electrodes, provides an almost fully automatic operation resulting in an increase in efficiency of 10 to 25 times, and an increase in accuracy of 3 to 5 times.

It will be obvious to those skilled in the art that various changes may be made in the invention without departing from the spirit and scope thereof and, therefore, the invention is not limited by that which is shown in the drawings and described in the specification, but only as indicated in the appended claims.

We claim:

1. A method of forming a complex surface on a workpiece comprising the steps of supporting a workpiece and supporting a tool having a contour providing an operative cutting surface complementary to the desired complex surface to be formed for relative feeding movement toward and away from one another, subjecting said tool and workpiece to a relative feeding movement toward one another, simultaneously subjecting said tool and workpiece to a relative translational forming movement along closed trajectory lines in planes perpendicular to the direction of feeding movement so that any point on the operative cutting surface of said tool follows an identical trajectory to progressively engage points on the operative cutting surface of said tools with said workpiece, continuing said relative forming movement until said workpiece is formed to provide the desired complex surface, introducing an electrolyte between said tool and workpiece, supplying an electric current to said tool and workpiece to provide for a combined electromechanical forming operation and supplying an abrasive suspension between said tool and said workpiece.

2. A method as defined in claim 1 and including the steps of subjecting said tool to a forming movement in a controlled curvilinear path with any point on the operative cutting surface of said tool following an identical trajectory to progressively engage points on the operative surface of said tool with said workpiece and with said engaging point forming an envelope having a shape and dimensions approximating the contour and size of said complex surface.

3. A method as defined in claim 1 and including the steps of subjecting said workpiece to a forming movement in a controlled curvilinear path with any point on said workpiece following an identical trajectory to progressively engage points on said workpiece with the operative cutting surface of said tool and with said engaging points forming an envelope having a shape and dimension approximating the contour and size of said complex surface.

4. A method as defined in claim 1 in which said trajectory lines are circles.

5. A method as defined in claim 1 and including the steps of subjecting said tool to a forming movement in a controlled rectangular path with any point on the operative cutting surface of said tool following an identical trajectory to progressively engage points on the operative cutting surface of said tool with said workpiece and with said engaging points forming an envelope having shape and dimensions approximating the contour and size of said complex surface.

6. A method as defined in claim 1 and including the steps of subjecting said workpiece to a forming movement in a controlled rectangular path with any point on said workpiece following an identical trajectory to progressively engage points on said workpiece with the operative cutting surface of said tool and with said engaging points forming an envelope having a shape and dimensions approximating the contour and size of said complex surface.

7. A method as defined in claim 1 in which said forming movement is oscillatory, and including the step of increasing the amplitude of said oscillatory movement during the forming operation.

8. A method as defined in claim 1 and including the step of exhausting air from between said tool and said workpiece to remove shavings resulting from the forming operation.

9. A method of forming a complex surface on a workpiece, comprising the steps of supporting a workpiece and supporting a tool having a contour providing an operative cutting surface complementary to the desired complex surface to be formed for relative feeding movement toward and away from one another, subjecting said tool and workpiece to a relative feeding movement toward one another, simultaneously subjecting said tool and workpiece to a relative translational forming movement along closed trajectory lines in planes perpendicular to the direction of feeding movement so that any point on the operative cutting surface of said tool follows an identical trajectory to progressively engage points on the operative cutting surface of said tools with said workpiece, continuing said relative forming movement until said workpiece is formed to provide the desired complex surface, introducing an electrolyte between said tool and workpiece, supplying an electric current to said tool and workpiece to provide for a combined electromechanical forming operation and supplying cutting elements between said tool and said workpiece by which the tool engages the workpiece surface being machined.

10. A method as defined in claim 1 and including the step of feeding washing water between said tool and said workpiece to remove shavings resulting from the forming operation.